(12) United States Patent
Satat

(10) Patent No.: US 11,496,722 B1
(45) Date of Patent: Nov. 8, 2022

(54) SYSTEMS AND METHODS FOR AUTOMATICALLY CALIBRATING MULTISCOPIC IMAGE CAPTURE SYSTEMS

(71) Applicant: X Development LLC, Mountain View, CA (US)

(72) Inventor: Guy Satat, Mountain View, CA (US)

(73) Assignee: X Development LLC, Mountain View, CA (US)

(*) Notice: Subject to any disclaimer, the term of this patent is extended or adjusted under 35 U.S.C. 154(b) by 24 days.

(21) Appl. No.: 17/132,097

(22) Filed: Dec. 23, 2020

(51) Int. Cl.
| | | |
|---|---|---|
| *H04N 13/246* | (2018.01) | |
| *G06T 7/70* | (2017.01) | |
| *H04N 13/271* | (2018.01) | |
| *G06V 20/10* | (2022.01) | |
| *G06T 7/80* | (2017.01) | |
| *G06N 3/08* | (2006.01) | |
| *G06K 9/62* | (2022.01) | |

(52) U.S. Cl.
CPC ......... *H04N 13/246* (2018.05); *G06K 9/6201* (2013.01); *G06N 3/084* (2013.01); *G06T 7/70* (2017.01); *G06T 7/85* (2017.01); *G06V 20/10* (2022.01); *H04N 13/271* (2018.05); *G06T 2207/10012* (2013.01); *G06T 2207/20224* (2013.01)

(58) Field of Classification Search
USPC .................. 348/61, 79, 76, 64, 135, 42
See application file for complete search history.

(56) References Cited

U.S. PATENT DOCUMENTS

| 11,048,744 | B1* | 6/2021 | Hohwald | G06F 16/51 |
| 2021/0150364 | A1* | 5/2021 | Mixter | G06N 3/04 |
| 2021/0358156 | A1* | 11/2021 | Price | G06T 7/593 |
| 2022/0046219 | A1* | 2/2022 | Obla | G06T 7/593 |

* cited by examiner

*Primary Examiner* — Daquan Zhao
(74) *Attorney, Agent, or Firm* — McDonnell Boehnen Hulbert & Berghoff LLP

(57) ABSTRACT

A method includes receiving, from a multiscopic image capture system, a plurality of images depicting a scene. The method includes determining, by application of a neural network based on the plurality of images, a disparity map of the scene. The neural network includes a plurality of layers, and the layers include a rectification layer. The method include determining a matching error of the disparity map based on differences between corresponding pixels of two or more images associated with the disparity map. The method includes back-propagating the matching error to the rectification layer of the neural network. Back-propagating the matching error includes updating one or more weights applied to the rectification layer.

20 Claims, 9 Drawing Sheets

SYSTEMS AND METHODS FOR AUTOMATICALLY CALIBRATING MULTISCOPIC IMAGE CAPTURE SYSTEMS

BACKGROUND

A robot may use a multiscopic image capture system to capture a plurality of images and thereby determine a disparity map of a scene. The disparity map may give an impression of depth resulting from a baseline distance separating different image capture devices in the multiscopic image capture system. A matching error for the disparity map may indicate how well the plurality of images are matched, and a reprojection error may indicate how accurately the disparity map corresponds to depth information.

SUMMARY

Example embodiments involve using a multiscopic image capture system to sense an environment of a robot. A computing device associated with the robot can be configured to determine a disparity map from images captured by the image capture system. The disparity map can be used for determining three-dimensional (3D) features of the environment. Example embodiments relate to determining a matching error of the disparity map, and back-propagating the matching error to calibrate the multiscopic image capture system.

In an embodiment, a method is provided. The method includes receiving, from a multiscopic image capture system, a plurality of images depicting a scene. The method includes determining, by application of a neural network based on the plurality of images, a disparity map of the scene. The neural network includes a plurality of layers, and the layers include a rectification layer. The method include determining a matching error of the disparity map based on differences between corresponding pixels of two or more images associated with the disparity map. The method includes back-propagating the matching error to the rectification layer of the neural network. Back-propagating the matching error includes updating one or more weights applied to the rectification layer.

In another embodiment, a system is provided. The system includes a multiscopic image capture system, one or more processors, a non-transitory computer readable medium, and program instructions stored on the non-transitory computer readable medium and executable by the one or more processors to receive, from the multiscopic image capture system, a plurality of images depicting a scene. The instructions are further executable by the one or more processors to determine, by application of a neural network based on the plurality of images, a disparity map of the scene. The neural network includes a plurality of layers, and the layers include a rectification layer. The instructions are further executable by the one or more processors to determine a matching error of the disparity map based on differences between corresponding pixels of two or more images associated with the disparity map. The instructions are further executable by the one or more processors to back-propagate the matching error to the rectification layer of the neural network. Back-propagating the matching error includes updating one or more weights applied to the rectification layer.

In a further embodiment, a non-transitory computer readable medium is provided. The non-transitory computer readable medium has stored therein instructions executable by one or more processors to cause a computing system to perform functions. The functions include receiving, from a multiscopic image capture system, a plurality of images depicting a scene. The functions include determining, by application of a neural network based on the plurality of images, a disparity map of the scene. The neural network includes a plurality of layers, and the layers include a rectification layer. The functions include determining a matching error of the disparity map based on differences between corresponding pixels of two or more images associated with the disparity map. The functions include back-propagating the matching error to the rectification layer of the neural network. Back-propagating the matching error includes updating one or more weights applied to the rectification layer.

In another embodiment, a system is provided. The system includes means for receiving, from a multiscopic image capture system, a plurality of images depicting a scene. The system includes means for determining, by application of a neural network based on the plurality of images, a disparity map of the scene. The neural network includes a plurality of layers, and the layers include a rectification layer. The system includes means for determining a matching error of the disparity map based on differences between corresponding pixels of two or more images associated with the disparity map. The system includes means for back-propagating the matching error to the rectification layer of the neural network. Back-propagating the matching error includes updating one or more weights applied to the rectification layer.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
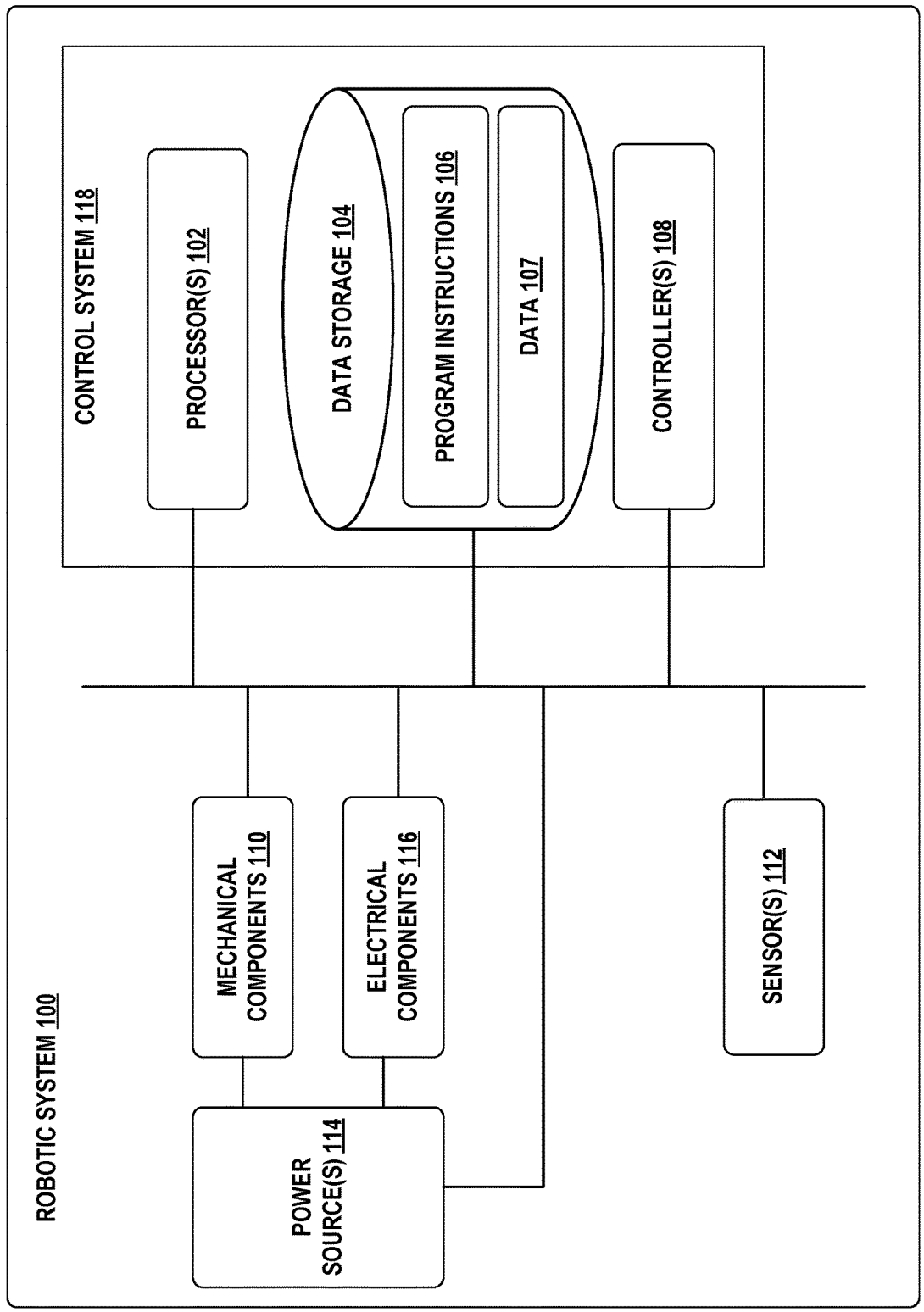
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For the purposes of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Overview

Example embodiments may include or otherwise relate to methods and systems for determining disparity maps using a multiscopic image capture system. The multiscopic image capture system may include a plurality of image capture devices separated by one or more baseline distances. For example, the multiscopic image capture system may include a pair of image capture devices for capturing stereoscopic images. Because the image capture devices are separated by a baseline distance, an impression of depth can be calculated by pixelwise matching of the images to determine a disparity map. This can be performed by a neural network.

A matching error is indicative of how closely corresponding pixels of two or more multiscopic images are matched in a disparity map. The matching error can be accounted for in post-processing of the disparity map, and can be used to recalibrate the multiscopic image capture system, such as adjusting one or more calibration parameters. In examples that lack runtime feedback of the matching error, adjusting the calibration parameters is performed after waiting for the multiscopic image capture system to go off-line. Examples described herein allow for a multiscopic image capture system to recalibrate itself during runtime using a matching error. In further examples, a baseline distance can be calibrated using a reprojection error indicative of how accurately the disparity map represents depth information.

As used herein, the term "disparity map" refers to a two-dimensional (2D) representation of a plurality of multiscopic images that indicates differences in positions of corresponding pixels between the multiscopic images. The corresponding pixels represent a common feature of an environment captured by each multiscopic image. Differences in the positions of corresponding pixels may indicate the depth which corresponds to these pixels. For example, a larger distance between corresponding pixels may indicate a smaller depth. As used herein, the term "matching error" refers to an error calculated based on how well two or more multiscopic images are matched in a disparity map or another 2D representation of a plurality of images. For example, differences in pixel values between corresponding pixels in two or more images corresponding the disparity map may indicate whether the pixels are well-matched. In some examples, the matching error can be determined based on a loss function that squares a difference in pixel values for corresponding pixels represented by the disparity map. In further examples, the matching error can be determined based on differences between patches of pixels (e.g., 7×7 patches) surrounding the corresponding pixels. In related examples, the patches can further be transformed, such as using an L2 norm, Census transform, or another transform. Determining the matching error can be performed in an unsupervised mode of a robot, and can be performed without use of a calibration target in the environment. Within examples, matching errors can be determined for each pixel of the disparity map and summed, averaged, or otherwise combined to determine an accumulated matching error.

As used herein, the term "reprojection error" refers to an error calculated based on how accurately a disparity map or another 2D representation of a 3D environment represents depth information. For example, a reprojection error can be determined based on a difference between projected pixel positions and pixel positions determined using the disparity map. This difference may be determined by projecting expected pixel locations (e.g., based on characteristics of an image capture device or based on a known distance to an object in a scene) onto a virtual plane and comparing these pixels to pixels determined from the disparity map (e.g., pixels of a depth map) to determine a geometric distance indicative of an error level. For example, the reprojection error can be represented in terms of pixels. A higher error level indicates less confidence in the quality of the disparity map in representing depth information. Within examples, the reprojection error can be calculated based on a known distance to a calibration target in an environment. Pixels associated with the disparity map (e.g., pixels in a resulting depth map) that correspond to the calibration target can be compared to projected pixels associated with known distance of the calibration target. This allows for recalibration of a baseline distance between two or more multiscopic image capture devices in an image capture system. Determining the reprojection error can be performed in a supervised mode of a robot that involves use of a calibration target in the environment to confirm depth information. Within examples, reprojection errors can be determined for each pixel of the disparity map and summed, averaged, or otherwise combined to determine an accumulated reprojection error.

As used herein, the term "back-propagation" refers to a backward propagation of an error, such as a matching error or a reprojection error, through layers of a neural network. The error can propagate from a last layer of the neural network to a first layer. For example, a gradient can be determined from weights in respective layers of a neural network used for generating a disparity map. This gradient may begin at the last layer of the neural network and progress backwards towards the first layer of the neural network. The gradient at the first layer (or another layer, such as a rectification layer) can be used to update the parameters in that layer.

Within examples, a neural network used for determining a disparity map includes a rectification layer. The rectification layer may include a plurality of nodes, and may perform element-wise absolute value operation on the input volume (e.g., an image). The rectification layer, like other layers in the neural network, can be associated with a plurality of weights, which are associated with emphasizing nodes as they pass inputs to another layer of the neural network. Within examples, the rectification layer can be implemented as part of a Rectified Linear Unit (ReLu) that combines non-linearity and rectification layers within the neural network. Instead of waiting for additional training or off-line recalibration, example methods and systems can back-propagate a matching error or reprojection error of the disparity map to the rectification layer during runtime to adjust the weights and thereby obtain more accurate disparity maps while the multiscopic image capture system is running. This may allow for depth map determination and sensing that improves while a system (e.g., a robot) is performing tasks.

Within examples, the multiscopic image capture system is part of a robot. For example, the multiscopic image capture system can be used for navigating the robot within an environment or for detecting and identifying different types of objects in the environment. Further, the multiscopic image capture system can be attached to an arm on the robot, and can be moved or reoriented using the arm. The arm can be used for purposes of calibrating the multiscopic image capture system, by orienting the multiscopic image capture system towards a target having a predetermined location. For example, the arm can be used to sweep the multiscopic image capture system through a plurality of positions while the multiscopic image capture system captures images. The images can be used for determining a disparity map, which can be compared to expected values associated with the target. Within examples, the target is placed on the robot, allowing for consistent calibration of the rectification layer regardless of whether other targets are present in the environment.

Within examples, a baseline distance between respective image capture devices in the multiscopic image capture system can be determined during an alternative calibration, or while calibrating the rectification layer of the neural network. This may similarly involve a target, and may allow for more accurate disparity maps by more accurately representing depths corresponding to respective pixels in the disparity map.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller(s) 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller(s) 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
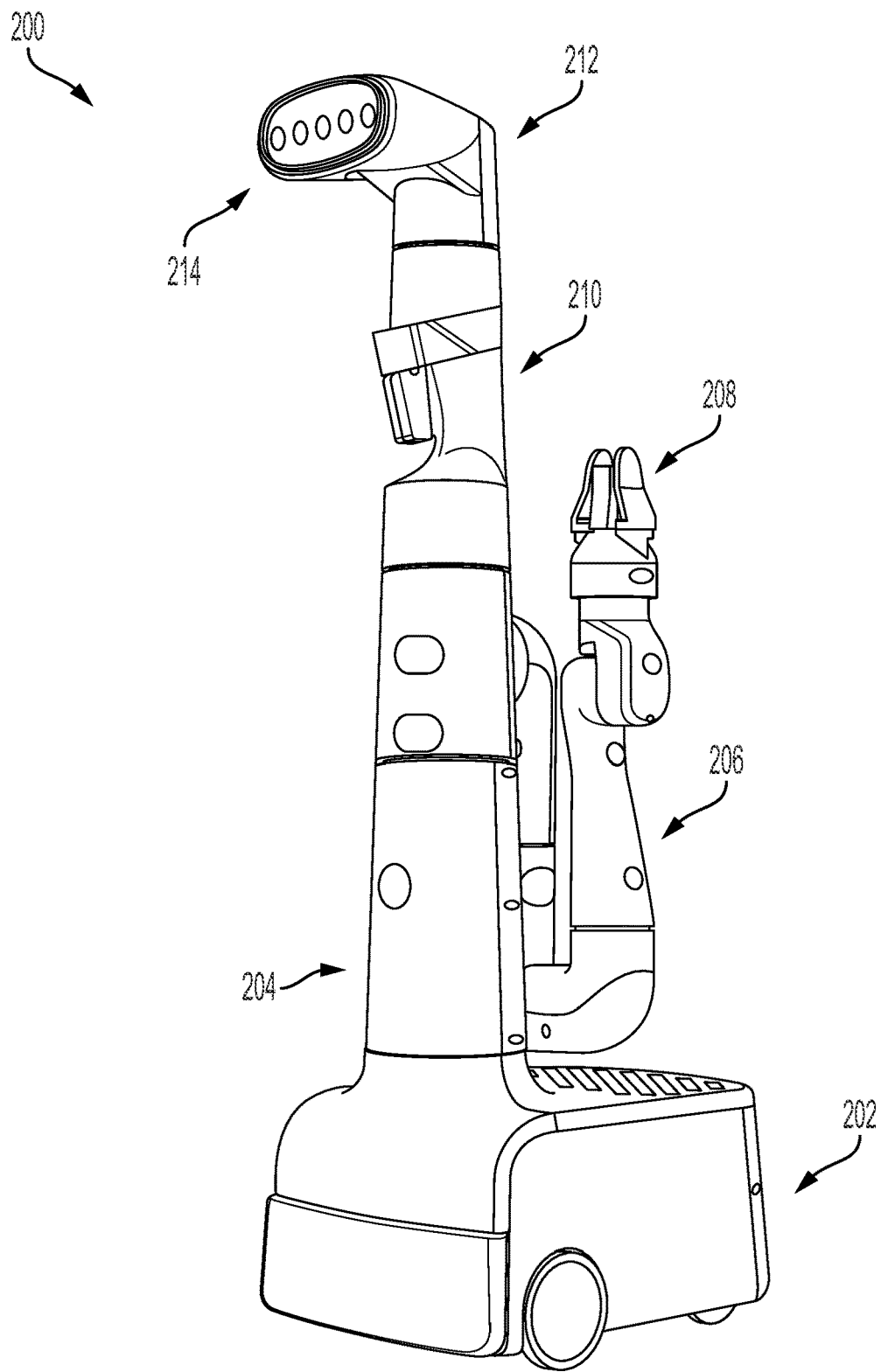
FIG. 2 illustrates a mobile robot, in accordance with example embodiments.
Figure 3:
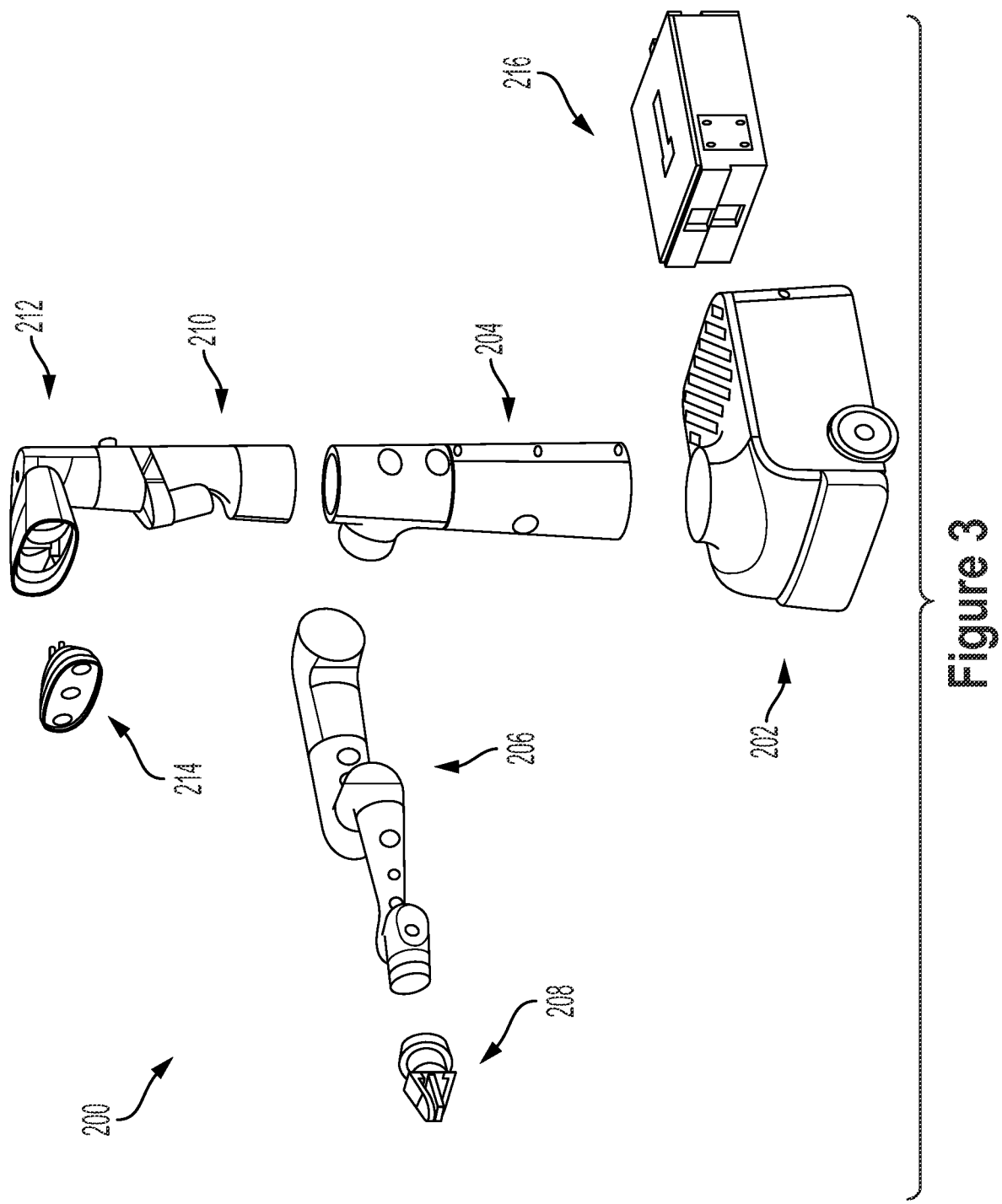
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D LIDAR sensor configured to collect depth information about the environment. The 3D LIDAR sensor may be coupled to a carved-out portion of the mast 210 and fixed at a downward angle. The LIDAR position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared (IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
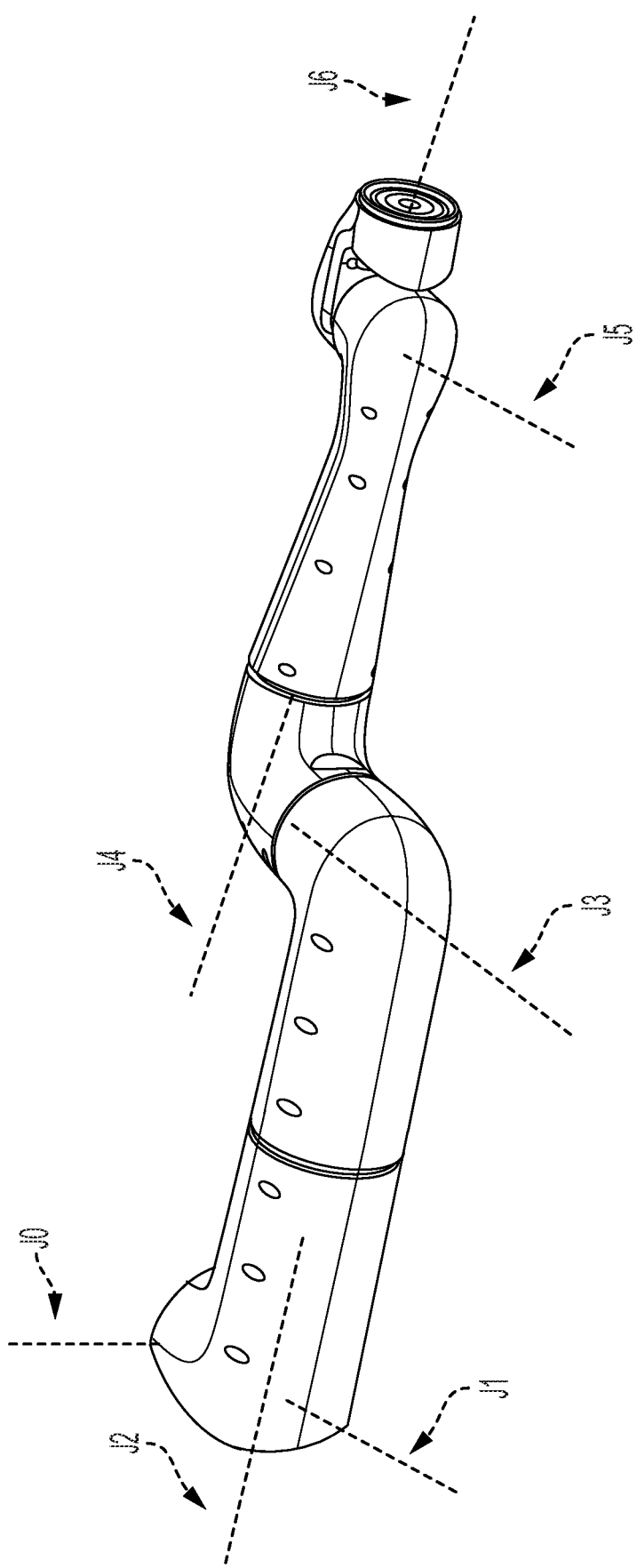
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
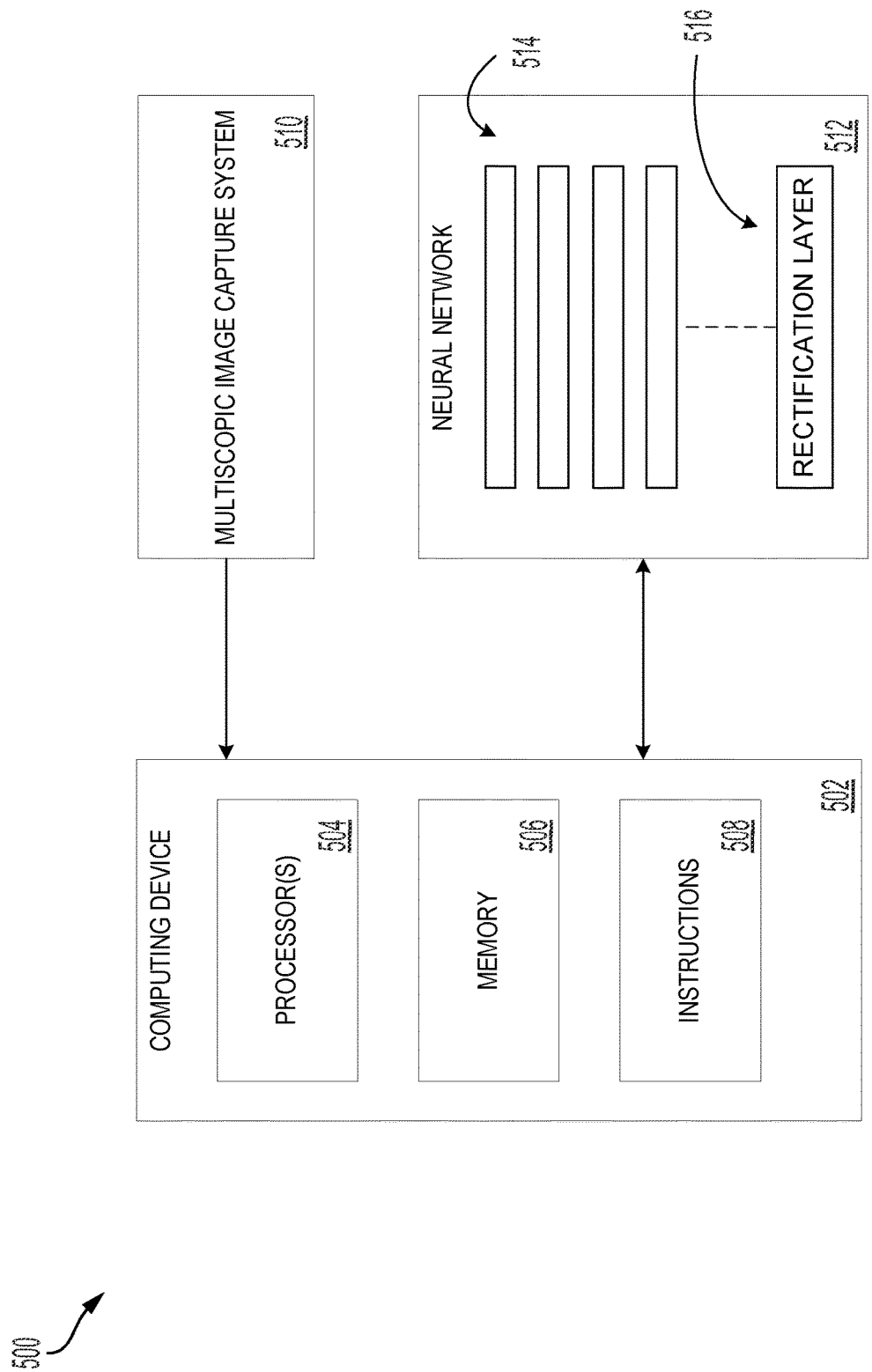
FIG. 5 is a block diagram of a system, in accordance with example embodiments.

FIG. 5 is a block diagram of a system 500, in accordance with example embodiments. In particular, FIG. 5 shows a computing device 502, a multiscopic image capture system 510, and a neural network 512. Collectively, computing device 502, multiscopic image capture system 510, and neural network 512 can create disparity maps used for determining 3D features of an environment. For example, the disparity maps can be used to determined depth maps of the environment that a robot uses for navigating with or interacting with the environment.

Computing device 502 includes one or more processor(s) 504, a memory 506, and instructions 508. Within examples, computing device 502 can be integrated into or communicate with a controller of robot. Computing device 502 may control aspects of multiscopic image capture, including calibrating multiscopic image capture system 510.

Processor(s) 504 may operate as one or more general-purpose hardware processors or special purpose hardware processors (e.g., digital signal processors, application specific integrated circuits, etc.). Processor(s) 504 may be configured to execute computer-readable program instructions (e.g., instructions 508), which may be stored in memory 506. Processor(s) 504 may also directly or indirectly interact with other components of system 500 or other systems or components (e.g., robotic system 100, sensor(s) 112, power source(s) 114, mechanical components 110, or electrical components 116).

Memory 506 may be one or more types of hardware memory. For example, Memory 506 may include or take the form of one or more computer-readable storage media that can be read or accessed by processor(s) 504. The one or more computer-readable storage media can include volatile or non-volatile storage components, such as optical, magnetic, organic, or another type of memory or storage, which can be integrated in whole or in part with processor(s) 504. In some implementations, memory 506 can be a single physical device. In other implementations, memory 506 can be implemented using two or more physical devices, which may communicate with one another via wired or wireless communication. As noted previously, memory 506 may include computer-readable program instructions (e.g., instructions 508).

Multiscopic image capture system 510 includes two or more image capture devices (e.g., cameras), which can synchronously capture a plurality of images of a scene (e.g., a field of view within an environment). The image capture devices can be incorporated into a robot. For example, the plurality of image capture devices can be part of perception suite 214 or disposed on EOAS 208. The plurality of image capture devices are separated by a baseline distance that allows for creation of disparity maps used for depth perception.

Neural network 512 can be two-dimensional convolutional neural network (2D CNN), a 2D shift invariant neural network (2D SINN), a 2D space invariant artificial neural network (2D SIANN), or another type of neural network configured for depth estimation and/or determining disparity maps. Neural network 512 is configured to receive a plurality of multiscopic images from multiscopic image capture system 510, to extract a plurality of corresponding two-dimensional features in the multiscopic images, and to output a disparity map or other 3D representation of a scene captured by the plurality of multiscopic images. Neural network 512 includes a plurality of layers 514, which includes a rectification layer 516. The plurality of layers 514 may include at least one convolutional layer, a pooling layer, and one or more hidden layers configured to filter and downsample the multiscopic images into a plurality of corresponding two-dimensional features used for creating a disparity map.

Rectification layer 516 can be a fully connected layer in neural network 512. Rectification layer 516 can be associated with a plurality of weights, which are used for emphasizing nodes as they pass inputs to another layer of neural network 512. As described further below with respect to FIG. 6, rectification layer 512 can be updated in real time based on a back-propagated reprojection error of the disparity map. This allows system 500 to optimize 3D perception during operation. For example, when system 500 is used with a robot, 3D perception can be optimized as the robot performs tasks. Within examples, rectification layer 512 can more generally operate as a differentiable operator associated with neural network 512 that can back-propagate to other layers. For example, the differentiable operator may depend in any differentiable way on another layer in the neural network such that it receives a first gradient from a layer that is after the differentiable operator and provides a second gradient to a layer that is before the differentiable operator. The differentiable operator can be within neural network 512 or can connect neural network 512 to other algorithms or neural networks.

FIG. 5 shows computing device 502, multiscopic image capture system 510, and neural network 512 being separate. Within examples, aspects of these components can be integrated into a single device or system. For example a server system could incorporate computing device 502 and neural network 512, and the server system may serve as a remote controller of multiscopic image capture system 510 and/or a robot. Within examples, multiscopic image capture system 510 and computing device 102 are integrated into a robot and neural network 512 is part of a remote server system. In these examples, computing system 502 may determine whether to recalibrate multiscopic image capture system 510 based on operational contexts of the robot. Further details of this process are described below with respect to FIG. 9.

Figure 6:
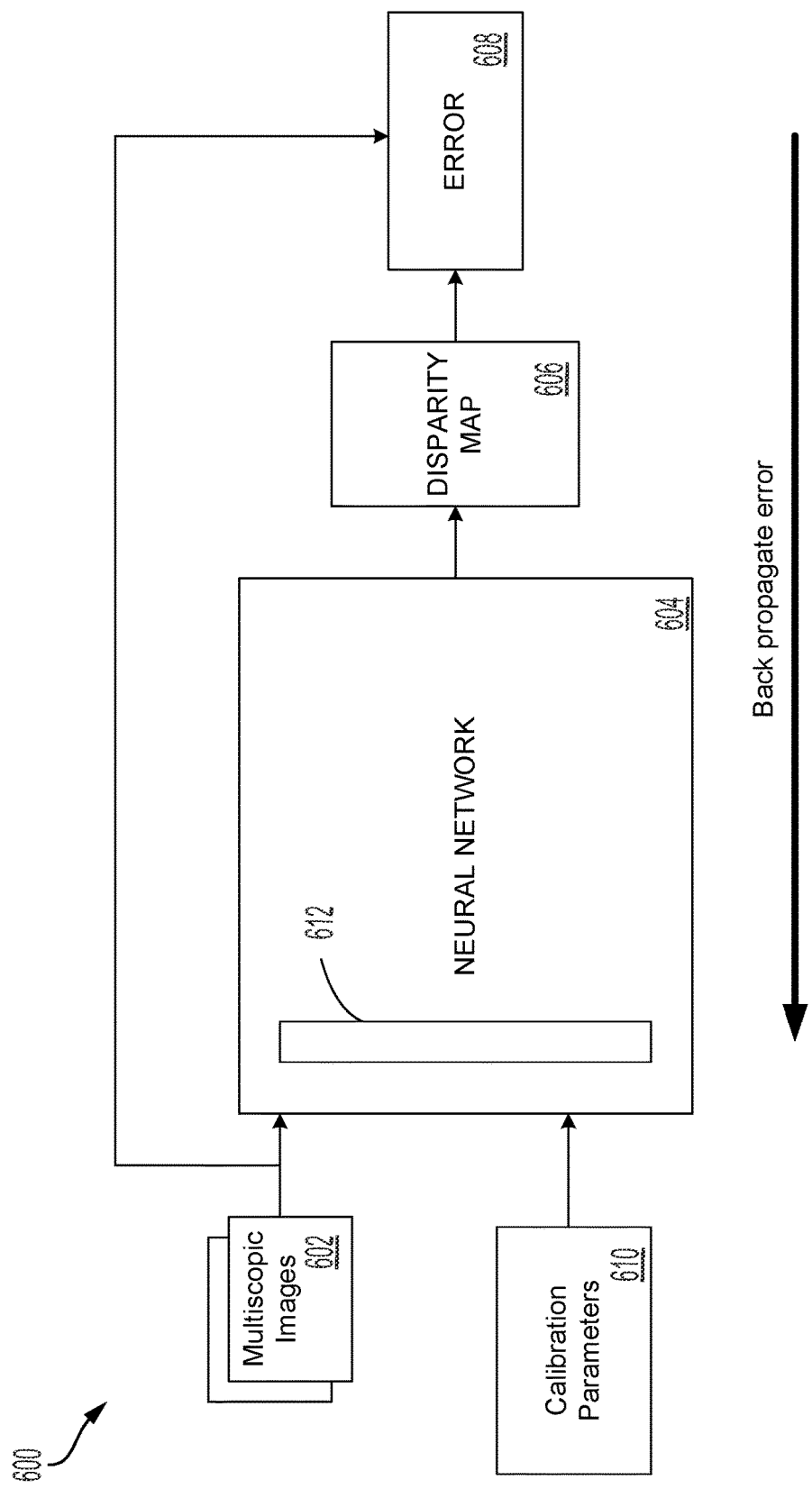
FIG. 6 illustrates a block diagram of operations of a system, in accordance with example embodiments.

FIG. 6 illustrates a block diagram of operations of a system 600, in accordance with example embodiments. In particular, FIG. 6 shows a process of recalibrating system 600 using a neural network. A plurality of multiscopic images 602 is captured by a multiscopic image capture system. Multiscopic images 602 depict the same scene within an environment, and because they are captured by separate image capture devices (e.g., separate cameras) separated by a baseline distance, they provide different perspectives of the scene. Multiscopic images 602 are provided to a neural network 604.

Neural network 604 determines a disparity map 606 that gives information of 3D features in a scene captured in multiscopic images 602. For example, at least one convolutional layer, a pooling layer, and one or more hidden layers can be configured to filter and downsample the multiscopic images into a plurality of corresponding two-dimensional features used for creating a disparity map. In practice these features may be single corresponding pixels from each multiscopic image, or clusters of corresponding pixels. The corresponding two-dimensional features can be used to create a disparity map of the scene. In some examples, neural network 604 can create the disparity map. In other examples, neural network 604 provides another output, such as a set of corresponding two-dimensional features, which can be used by a computing device to create the disparity map or another representation of 3D features in the scene.

An error 608 is determined based on the disparity map. For example, a computing device may determine a matching error or a reprojection error depending on an operating mode of the system (e.g., depending on whether a calibration target is visible in the multiscopic images 602). The matching error indicates a quality matching images in disparity map 606 and the reprojection error indicates a quality of disparity map 606 in representing depth information (e.g., based on a depth map determined from disparity map 606). For example, a matching error of less than 1% may indicate a high-quality match between corresponding images of disparity map 606, while a matching error being greater than 1% may indicate a lower-quality disparity map, and may prompt recalibration of system 600. For example, this may involve back-propagating the matching error in an unsupervised mode or entering a supervised mode that uses a calibration target. In the supervised mode, the calibration target can be used to determine a reprojection error between pixels determined from the depth map and projected pixels based on a known depth of the calibration target. A reprojection error being less than one pixel may indicate a high-quality disparity map that provides reliable depth information, while a reprojection error being greater than one pixel may indicate a lower-quality disparity map.

Neural network 604 is initialized with calibration parameters 610 that are determined offline. For example, calibration parameters 610 can be determined by a computing device before system 600 or another device or system (e.g., a robot) begins performing tasks. Calibration parameters 610 can take the form of weights applied to one or more layers of neural network 604 that optimize an output, such as a disparity map. For example, calibration parameters can be determined while training neural network 604, or while retraining neural network 604. The calibration parameters may also include known qualities of the system, such as a baseline distance between respective image capture devices, orientations of the image capture devices, or error terms associated with the image capture devices.

Neural network 604 includes a plurality of layers including a rectification layer 612. Rectification layer 612 may include a plurality of weighted nodes, each node applying rectifier function to a received input (e.g., an unfiltered version of multiscopic images 602 or an output of another layer in neural network 604). Accordingly, rectification layer 612 may be integrated with convolutional layers in a convolutional neural network (CNN) structure. As noted above, rectification layer 612 may operate as a fully connected layer in neural network 604. In other examples, rectification layer might not operate as a fully connected layer, but rather as a general differentiable operator within neural network 604.

During operation of system 600, variables of the system or the environment may change that affect the accuracy of an output disparity map. For example, changes in lighting, temperature, or humidity may affect image quality, and impacts to the multiscopic image capture system may affect a baseline distance or orientation of the multiscopic image capture system, thereby changing the quality of output disparity maps. System, 600 may detect certain threshold conditions that cause the system to recalibrate rectification layer 612 during runtime. Recalibrating weights of rectification layer 612 during runtime rather than updating calibration parameters 610 may allow system 600 to continuously operate, even in changing conditions.

Recalibrating weights of rectification layer 612 involves back-propagating error 608 through a plurality of layers in neural network 604 until reaching recalibration layer 612. In some examples, calibration parameters 610 can also be updated by back-propagating through recalibration layer 612. For example, a baseline distance in calibration parameters 610 may be updated by back-propagating a reprojection error through neural network 604.

Figure 7:
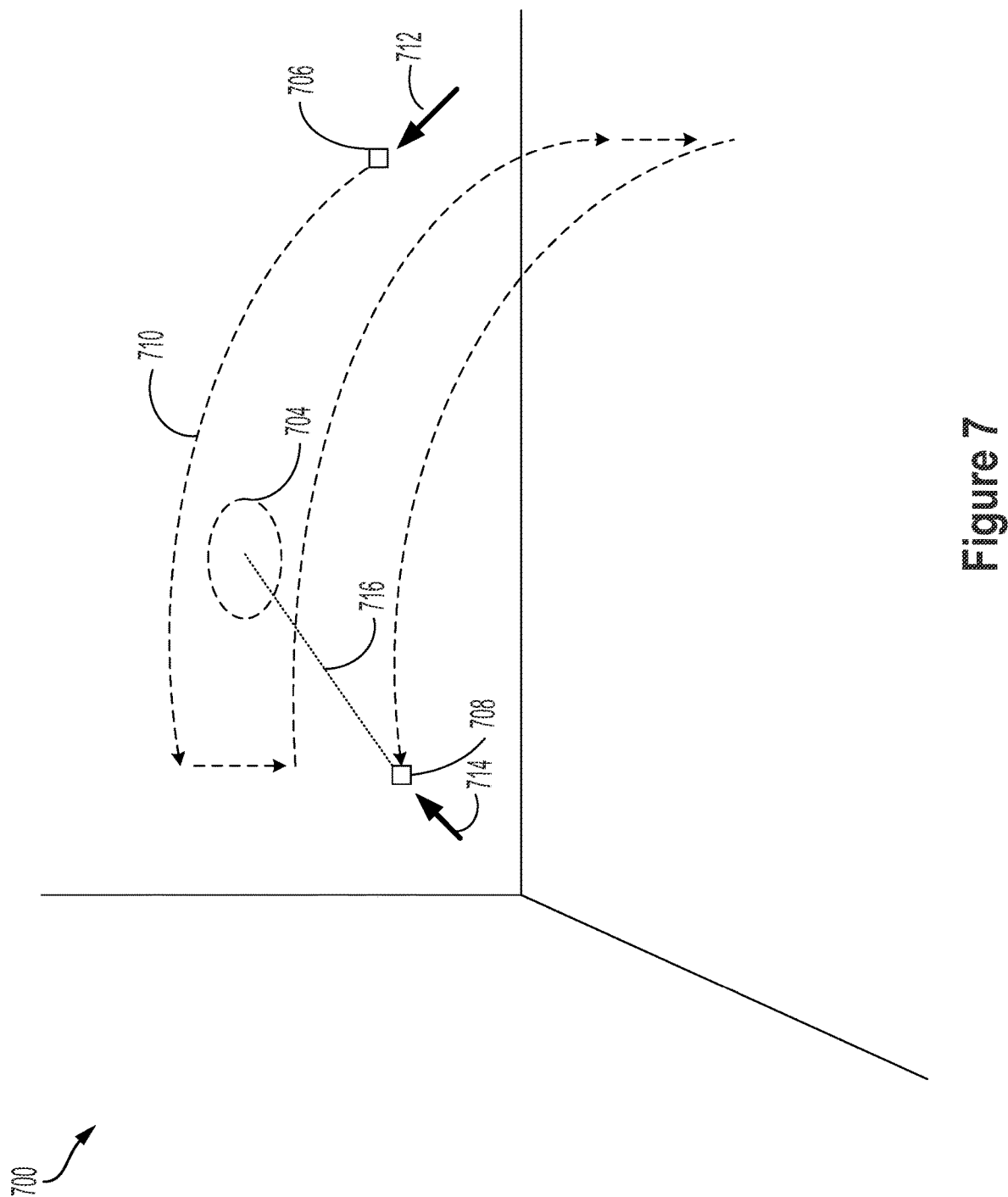
FIG. 7 illustrates an environment of a robot, in accordance with example embodiments.

FIG. 7 illustrates an environment 700 of a robot, in accordance with example embodiments. The robot is not depicted for purposes of simplicity. Within examples, a robot may include a multiscopic image capture system, which can be used to sense environment 700. The multiscopic image capture system can be used to capture multiscopic images used to determine 3D features of environment 700, thereby allowing the robot to effectively navigate. In some operational contexts, the multiscopic image capture system may provide images that result in less effective disparity maps of environment 700.

Within examples, the robot or a computing device thereof can evaluate disparity maps periodically, and determine that a given disparity map is less effective than a desired effectiveness level. For example, this may involve determining a matching error from the disparity map and determining that the matching error is higher than a threshold error level (e.g., above 1%), or that a difference between a depth estimate from the disparity map and a depth estimate from another sensor (e.g., a depth estimate from a LIDAR device or radar device on the robot) is greater than a threshold difference (e.g., an average difference that is greater than 10%). In other examples, the robot may detect events or contexts that are likely to impact the multiscopic image capture system. For example, the robot may detect that it has impacted an object, or that the multiscopic image capture system has been impacted. These determinations may serve as prompts or triggers to recalibrate a neural network used for determining disparity maps.

Recalibrating the neural network may include back-propagating the matching error through the neural network to a rectification layer, and may additionally or alternatively include aiming the multiscopic image capture system at a recalibration target 704 in environment 700 to determine a reprojection error. In some examples, the recalibration target may be a known object (e.g., a previously detected object or an object placed at a particular location in environment 700) in environment 700, which allows for accurate determination of distance between the multiscopic image capture system and recalibration target 704 (e.g., the distance can be geometrically determined based on a known shape or pattern on recalibration target 704). Adjusting a distance between the multiscopic image capture system and the recalibration target 704 in a predetermined manner allows the robot to sequentially determine reprojection errors of the same target and evaluate adjustments to the rectification layer. In these examples, the robot may first determine that the multiscopic image capture system is facing recalibration target 704 prior to initiating a recalibration sequence.

Adjusting the distance between the multiscopic image capture system and the recalibration target 704 can involve moving the robot or components of the robot. For example, the multiscopic image capture system can be coupled to an arm, and determining that the multiscopic image capture system is facing the recalibration target can include determining that the multiscopic image capture system is facing the recalibration target based on an orientation of the arm. In these examples, the recalibration target 704 may have a known location relative to the arm and/or the robot.

The robot may also move the multiscopic image capture system through a range of locations by sweeping an arm of the robot in a predetermined motion. For example, as shown in FIG. 7, the multiscopic image capture system can start at a starting location 706 and end at an ending location 708. Between the starting location 706 and ending location 708, the arm may follow a path 710, and may also adjust an orientation of the multiscopic image capture system to face recalibration target 704. For example, a starting orientation 712 of the multiscopic image capture system is different from an ending orientation 708. Each orientation is directed towards calibration target 704. For example, ending orientation 714 directs a line of sight 716 to recalibration target 704. As shown in FIG. 7, the predetermined range of locations includes a path that sweeps back and forth at different distances from recalibration target 704. This allows for multiple opportunities to test an accuracy of the disparity maps from the neural network and to allow for improved weights in the rectification layer.

While the robot moves the multiscopic image capture system through the range of locations, the multiscopic image capture system captures a plurality of recalibration images, and the robot identifies recalibration target 704 in at least two of the recalibration images. The at least two recalibration images are captured at different distances from the recalibration target, and back-propagating the reprojection error includes updating the one or more weights applied to the rectification layer based on the at least two recalibration images. In this manner, a robot can recalibrate the multiscopic image capture system during runtime. In some examples, the robot can perform this recalibration while performing other tasks, such as while navigating to a location in environment 700.

In addition to recalibrating the neural network, the robot can determine the baseline distance between respective image capture devices of the multiscopic image capture system. The baseline distance is associated with a multiplier for depths determined from the disparity maps. Determining the baseline distance can include determining a distance between the multiscopic image capture system to recalibration target 704 based on one or more disparity maps determined from the plurality of recalibration images, comparing the determined distance to an expected distance (e.g., based a distance determined based on a relative size of recalibration target 704 in the images), and determining the baseline distance based on a difference between the determined distance and the expected distance. For example, the baseline distance can be adjusted using a ratio of the difference and the expected distance. Other ways of adjusting the baseline distance are possible.

Figure 8:
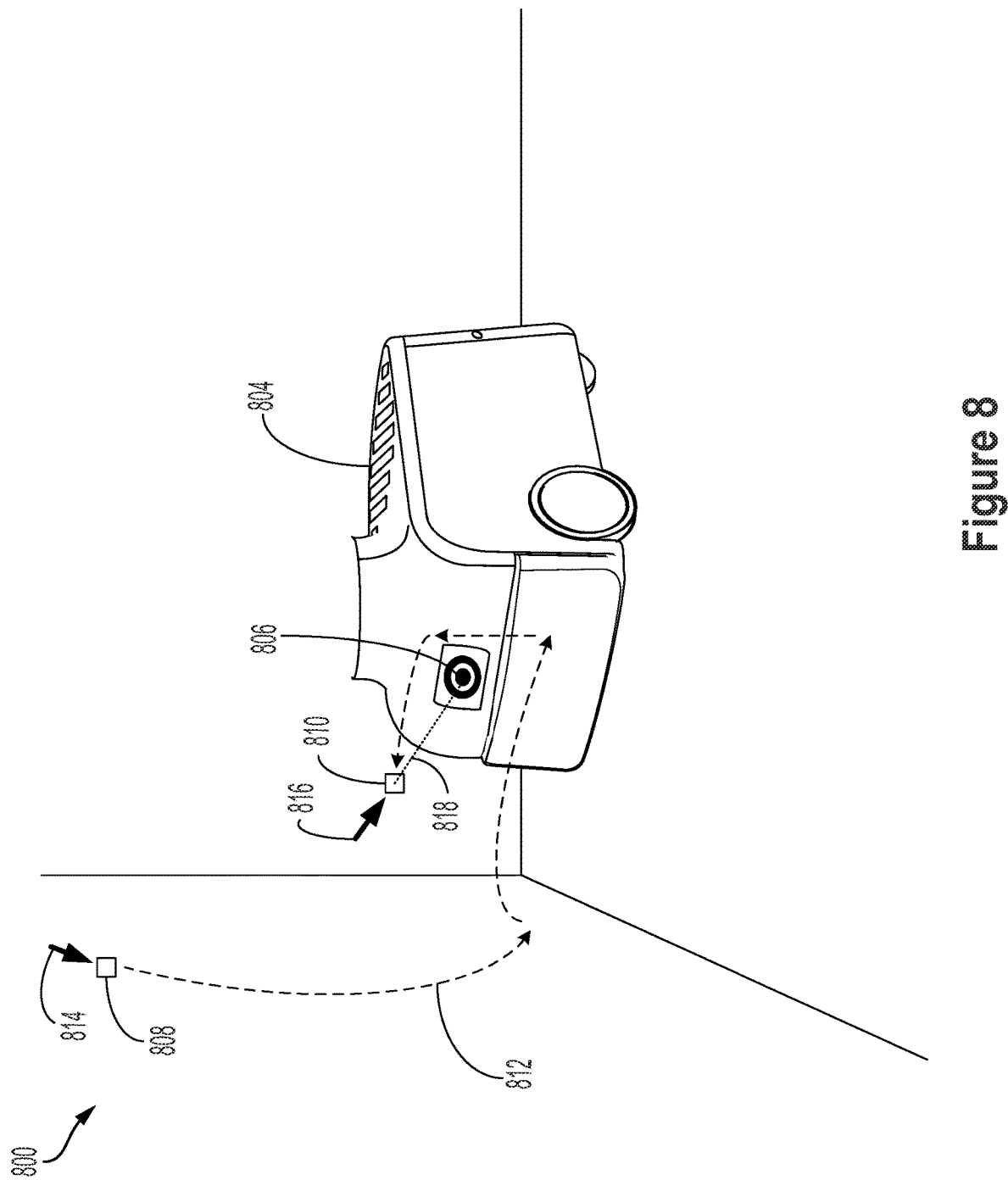
FIG. 8 illustrates an environment of a robot, in accordance with example embodiments.

FIG. 8 illustrates an environment of a robot, in accordance with example embodiments. Some components of the robot are omitted for purposes of simplicity. Within examples, a robot may include a multiscopic image capture system, which can be used to sense environment 800. The multiscopic image capture system can be used to capture multiscopic images used to determine 3D features of environment 800, thereby allowing the robot to effectively navigate. In some operational contexts, the multiscopic image capture system may provide images that result in less effective disparity maps of environment 800.

As described above with respect to FIG. 7, the robot or a computing device thereof can determine that a given disparity map is less effective than a desired effectiveness level. For example, a reprojection error of the given disparity map may exceed a threshold error level. This determination may serve as a prompt or trigger to recalibrate a neural network used for determining disparity maps.

Recalibrating the neural network may include aiming the multiscopic image capture system at a recalibration target 806 in environment 800. In particular, this may involve aiming the multiscopic image capture device at an area of the robot, such as an area on a mobile base 804 of the robot. Aiming at a recalibration target on the robot allows for the robot to recalibrate using a known target regardless of a position of the robot in environment 800. Adjusting a distance between the multiscopic image capture system and recalibration target 806 in a predetermined manner allows the robot to sequentially determine reprojection errors of the same target and evaluate adjustments to the rectification layer. In these examples, the robot may first determine that the multiscopic image capture system is facing recalibration target 806 prior to initiating a recalibration sequence.

Adjusting the distance between the multiscopic image capture system and the recalibration target 806 can involve moving the robot or components of the robot. For example, the multiscopic image capture system can be coupled to an arm, and determining that the multiscopic image capture system is facing the recalibration target can include determining that the multiscopic image capture system is facing the recalibration target 806 based on an orientation of the arm. For example, the robot can determine that the arm is positioned proximate to mobile base 804 to determine that the multiscopic image capture system is facing recalibration target 806. The robot may back-propagate a matching error substantially concurrently with back-propagating the reprojection error to allow for calibration of a rectification layer and a baseline distance while operating in a supervised mode that used recalibration target 806. This may allow for less frequent recalibrations while the robot performs tasks.

The robot may also move the multiscopic image capture system through a range of locations by sweeping an arm of the robot in a predetermined motion. For example, as shown in FIG. 8, the multiscopic image capture system can start at a starting location 808 and end at an ending location 810. Between the starting location 808 and ending location 810, the arm may follow a path 812, and may also adjust an orientation of the multiscopic image capture system to face recalibration target 806. For example, a starting orientation 814 of the multiscopic image capture system is different from an ending orientation 816. Each orientation is directed towards calibration target 806. For example, ending orientation 816 directs a line of sight 818 to recalibration target 806. As shown in FIG. 8, the predetermined range of locations includes a path that sweeps back and forth in front of mobile base 804 at different distances from recalibration target 806. This allows for multiple opportunities to test an accuracy of the disparity maps from the neural network and to allow for improved weights in the rectification layer.

While the robot moves the multiscopic image capture system through the range of locations, the multiscopic image capture system captures a plurality of recalibration images, and the robot identifies recalibration target 806 in at least two of the recalibration images. The at least two recalibration images are captured at different distances from the recalibration target 806, and back-propagating the reprojection error includes updating the one or more weights applied to the rectification layer based on the at least two recalibration images. In this manner, a robot can recalibrate the multiscopic image capture system during runtime. In some examples, the robot can perform this recalibration while performing other tasks, such as while navigating to a location in environment 700.

In addition to recalibrating the neural network, the robot can determine the baseline distance between respective image capture devices of the multiscopic image capture system. The baseline distance is associated with a multiplier for depths determined from the disparity maps. Determining the baseline distance can include determining a distance between the multiscopic image capture system to recalibration target 806 based on one or more disparity maps determined from the plurality of recalibration images, comparing the determined distance to an expected distance (e.g., based a distance determined based on a relative size of recalibration target 806 in the images), and determining the baseline distance based on a difference between the determined distance and the expected distance. For example, the baseline distance can be adjusted using a ratio of the difference and the expected distance. Other ways of adjusting the baseline distance are possible.

Figure 9:
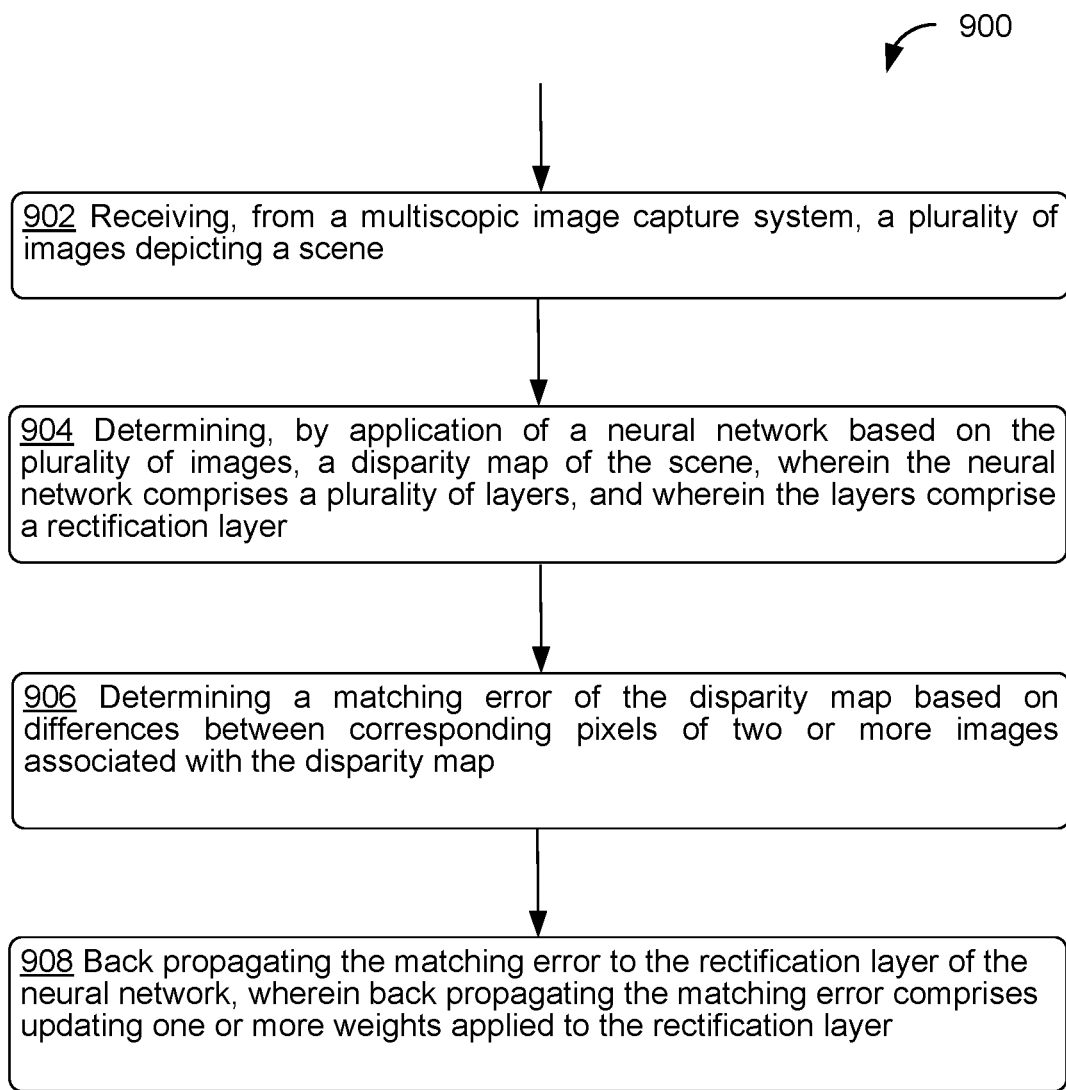
FIG. 9 is a block diagram of a method, in accordance with example embodiments.

FIG. 9 is a block diagram of a method 900, in accordance with example embodiments. In some examples, method 900 of FIG. 9 may be carried out by a control system, such as control system 118 of robotic system 100 or a computing device such as computing device 502 of system 500. In further examples, method 900 may be carried out by one or more processors, such as processor(s) 102 and/or processor(s) 504, executing program instructions, such as computer-readable program instructions 106 and/or instructions 508, stored in a data storage, such as data storage 104 and/or memory 506. Execution of method 900 may involve a robotic device, such as illustrated and described with respect to FIGS. 1-4, or another system. Other robotic devices may also be used in the performance of method 900. In further examples, some or all of the blocks of method 900 may be performed by a control system remote from the robotic device or from system 500. In yet further examples, different blocks of method 900 may be performed by different control systems, located on and/or remote from a robotic device or from system 500.

At block 902, method 900 includes receiving, from a multiscopic image capture system, a plurality of images depicting a scene. For example, the images can include sets of multiscopic images. Each set can include one image from a respective image capture device in the multiscopic image capture system. For example, each set can include at least two images corresponding to at least two separate image capture devices.

At block 904, method 900 includes determining, by application of a neural network based on the plurality of images, a disparity map of the scene. For example, a computing device may send a representation of the images to the neural network. Within examples, the neural network is local to the computing device (e.g., contained in the same local network, or within a robot). The neural network includes a plurality of layers, and the layers include a rectification layer. The neural network is trained to determine a disparity map using the plurality of images, and outputs a disparity map. In alternative examples, the neural network can output a depth map or another representation of 3D features of the scene. The rectification layer can be a fully-connected rectification layer in the neural network, or more generally can be a differentiable operator associated with the neural network.

At block 906, method 900 includes determining a matching error of the disparity map based on differences between corresponding pixels of two or more images associated with the disparity map. Images having pixels that are better matched by the neural network when creating the disparity map have a lower matching error.

Within examples, block 906 may further involve determining a reprojection error of the disparity map based on a difference between projected pixel positions corresponding to characteristics of the multiscopic image capture system and determined pixel positions associated with the disparity map. Within examples, determining the reprojection error includes determining a baseline projection of each pixel based on field of view, lens shape, baseline distance, and/or other optical or sensor characteristics of the multiscopic image capture system. The baseline projection indicates an expected position of each pixel in the disparity map. Determining the reprojection error further includes determining an actual pixel position for each pixel in the disparity map, comparing the actual position to the expected position, and calculating a difference for each pixel. The reprojection error can be a cumulative number (e.g., a sum or average of reprojection errors for each term) or a 2D array of errors.

At block 908, method 900 includes back-propagating the matching error to the rectification layer of the neural network, wherein back-propagating the matching error comprises updating one or more weights applied to the rectification layer. Back-propagating the matching error may involve determining a gradient for the matching error based on weights in respective layers of the neural network. The gradient may begin at a last layer of the neural network and progress backwards towards a first layer of the neural network or to other operators, algorithms, or networks associated with the neural network.

Within examples, method 900 further includes identifying a recalibration trigger. For example, identifying the recalibration trigger may include determining that the matching error exceeds a threshold error level (e.g., an average error greater than one pixel). In these examples, back-propagating the matching error to the rectification layer is performed responsive to identifying the recalibration trigger. In related examples, identifying the recalibration trigger includes determining that a threshold period has elapsed since a previous instance of back-propagating the matching error. In additional examples, identifying the recalibration trigger includes determining that the matching error exceeds a threshold error (e.g., a 1% error). In further examples, identifying the recalibration trigger includes determining that the multiscopic image capture system is facing a recalibration target. For example, determining that the multiscopic image capture system is facing the recalibration target can include detecting the recalibration target using one or more of the plurality of images. In other examples, the multiscopic image capture system is coupled to an arm, and determining that the multiscopic image capture system is facing the recalibration target includes determining that the multiscopic image capture system is facing the recalibration target based on an orientation of the arm. For example, the arm can be part of a robot. In these examples, the recalibration target is disposed on an area of the robot, and determining that the multiscopic image capture system is facing the recalibration target based on an orientation of the arm includes determining that the multiscopic image capture system is facing the area of the robot based on the orientation of the arm.

Within examples, the multiscopic image capture system is coupled to an arm. In these examples, method 900 may include identifying a recalibration trigger. Method 900 may further include, responsive to identifying the recalibration trigger, moving the multiscopic image capture system through a range of locations relative to a recalibration target. For example, the range of locations may include a predetermined sweep of the arm within an environment. Method 900 may further include capturing a plurality of recalibration images while moving the image capture device, and identifying a recalibration target in at least two of the recalibration images. The at least two recalibration images are captured at different distances from the recalibration target. Method 900 further includes determining a reprojection error based on the at least two recalibration images and back-propagating the reprojection error by updating the one or more weights applied to the rectification layer based on the at least two recalibration images. and back-propagating the reprojection error includes updating the one or more weights applied to the rectification layer based on the at least two recalibration images. For example, this may be performed as described above with respect to FIGS. 7 and 8.

Within examples, the multiscopic image capture system is part of a robot. In these examples, method 900 may further include initially calibrating the rectification layer prior to causing the robot to perform one or more tasks, and causing the robot to perform a task. Causing the matching error to back-propagate to the rectification layer of the neural network includes recalibrating the rectification layer while the robot is performing the task.

Within examples, method 900 further includes determining a baseline distance between two or more image capture devices of the multiscopic image capture system. Determining the disparity map of the scene is based on the baseline distance. In related examples, method 900 further includes identifying a baseline reset trigger. For example, the baseline reset trigger can be determined by (i) determining a difference between an expected distance to a recalibration trigger and a distance derived from a disparity map from the neural network, and (ii) determining that the difference exceeds a threshold difference (e.g., a 10% difference). In these examples, determining the baseline distance is performed responsive to identifying the baseline reset trigger. Within examples, the multiscopic image capture system is part of a robot, and wherein identifying the baseline reset trigger comprises determining that the robot has sustained an impact by an object.

Though some of the functions described with respect to method 900 refer to robot operations, it should be understood that similar functionality can be implemented in other systems, such as vehicle systems, or manufacturing systems.

CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving, from a multiscopic image capture system, a plurality of images depicting a scene;
   determining, by application of a neural network based on the plurality of images, a disparity map of the scene, wherein the neural network comprises a plurality of layers;
   determining a matching error of the disparity map based on differences between corresponding pixels of two or more images associated with the disparity map;
   identifying a recalibration trigger, wherein identifying the recalibration trigger comprises determining that the matching error exceeds a threshold error; and
   based on identifying the recalibration trigger, back-propagating the matching error to one or more layers of the plurality of layers of the neural network, wherein back-propagating the matching error comprises updating one or more weights applied to the one or more layers.

2. The method of claim 1, wherein identifying the recalibration trigger further comprises determining that a threshold period has elapsed since a previous instance of back-propagating the matching error.

3. The method of claim 1, wherein identifying the recalibration trigger further comprises determining that the multiscopic image capture system is facing a recalibration target.

4. The method of claim 3, wherein determining that the multiscopic image capture system is facing the recalibration target comprises detecting the recalibration target using one or more of the plurality of images.

5. The method of claim 3, wherein the multiscopic image capture system is coupled to an arm, wherein determining that the multiscopic image capture system is facing the recalibration target comprises determining that the multiscopic image capture system is facing the recalibration target based on an orientation of the arm.

6. The method of claim 5, wherein the arm is part of a robot, wherein the recalibration target is disposed on an area of the robot, and wherein determining that the multiscopic image capture system is facing the recalibration target based on an orientation of the arm comprises determining that the multiscopic image capture system is facing the area of the robot based on the orientation of the arm.

7. The method of claim 1, wherein the multiscopic image capture system is coupled to an arm, the method further comprising:
responsive to identifying the recalibration trigger, moving the multiscopic image capture system through a range of locations relative to a recalibration target;
capturing a plurality of recalibration images while moving the multiscopic image capture system;
identifying the recalibration target in at least two recalibration images of the recalibration images, wherein the at least two recalibration images are captured at different distances from the recalibration target;
determining a reprojection error based on the at least two recalibration images; and
back-propagating the reprojection error by updating the one or more weights applied to the one or more layers based on the at least two recalibration images.

8. The method of claim 7, wherein the range of locations comprises a pre-determined sweep of the arm within an environment.

9. The method of claim 1, wherein the multiscopic image capture system is part of a robot, the method further comprising:
initially calibrating the one or more layers prior to causing the robot to perform one or more tasks; and
causing the robot to perform a task, wherein back-propagating the matching error to the one or more layers of the neural network comprises recalibrating the one or more layers while the robot is performing the task.

10. The method of claim 1, further comprising:
determining a baseline distance between two or more image capture devices of the multiscopic image capture system, wherein determining the disparity map of the scene is based on the baseline distance.

11. The method of claim 10, further comprising:
identifying a baseline reset trigger, wherein determining the baseline distance is performed responsive to identifying the baseline reset trigger.

12. The method of claim 11, wherein the multiscopic image capture system is part of a robot, and wherein identifying the baseline reset trigger comprises determining that the robot has sustained an impact by an object.

13. The method of claim 1, wherein the one or more layers comprise a rectification layer.

14. A system comprising:
a multiscopic image capture system;
one or more processors;
a non-transitory computer readable medium; and
program instructions stored on the non-transitory computer readable medium and executable by the one or more processors to:
receive, from the multiscopic image capture system, a plurality of images depicting a scene;
determine, by application of a neural network based on the plurality of images, a disparity map of the scene, wherein the neural network comprises a plurality of layers;
determine a matching error of the disparity map based on differences between corresponding pixels of two or more images associated with the disparity map;
identify a recalibration trigger, wherein identifying the recalibration trigger comprises determining that the matching error exceeds a threshold error; and
based on identifying the recalibration trigger, back-propagate the matching error to one or more layers of the plurality of layers of the neural network, wherein back-propagating the matching error comprises updating one or more weights applied to the one or more layers.

15. The system of claim 14, wherein the multiscopic image capture system is coupled to an arm, the program instructions being further executable to:
responsive to identifying the recalibration trigger, moving the multiscopic image capture system through a range of locations relative to a recalibration target;
capturing a plurality of recalibration images while moving the multiscopic image capture system;
identifying the recalibration target in at least two recalibration images of the recalibration images, wherein the at least two recalibration images are captured at different distances from the recalibration target;
determining a reprojection error based on the at least two recalibration images; and
back-propagating the reprojection error by updating the one or more weights applied to the one or more layers based on the at least two recalibration images.

16. The system of claim 14, wherein identifying the recalibration trigger further comprises determining that the multiscopic image capture system is facing a recalibration target.

17. The system of claim 14, wherein the multiscopic image capture system is part of a robot, the program instructions being further executable to:
initially calibrate the one or more layers prior to causing the robot to perform one or more tasks; and
causing the robot to perform a task, wherein back-propagating the matching error to the one or more layers of the neural network comprises recalibrating the one or more layers while the robot is performing the task.

18. The system of claim 14, wherein the one or more layers comprise a rectification layer.

19. A non-transitory computer readable medium having stored therein instructions executable by one or more processors to cause a computing system to perform functions comprising:
receiving, from a multiscopic image capture system, a plurality of images depicting a scene;
determining, by application of a neural network based on the plurality of images, a disparity map of the scene, wherein the neural network comprises a plurality of layers;

determining a matching error of the disparity map based on differences between corresponding pixels of two or more images associated with the disparity map;

identifying a recalibration trigger, wherein identifying the recalibration trigger comprises determining that the matching error exceeds a threshold error; and based on identifying the recalibration trigger, back-propagating the matching error to one or more layers of the neural network, wherein back-propagating the matching error comprises updating one or more weights applied to the one or more layers.

20. The non-transitory computer readable medium of claim 19, wherein the one or more layers comprise a rectification layer.

\* \* \* \* \*